H. HESS.
THRUST BEARING.
APPLICATION FILED AUG. 13, 1908. RENEWED DEC. 2, 1916.
1,232,800.
Patented July 10, 1917.
2 SHEETS—SHEET 1.
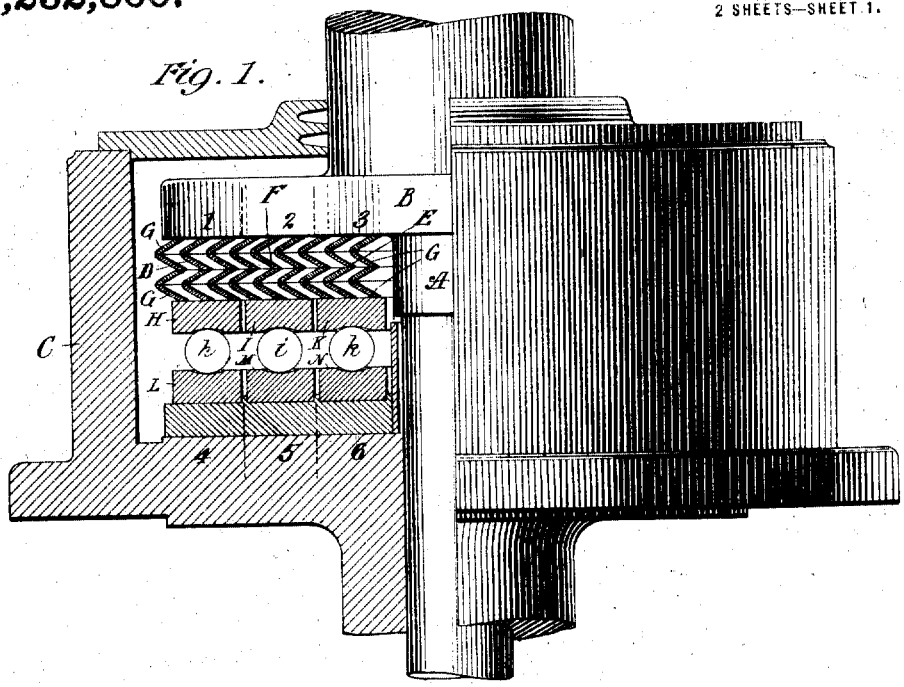
Fig. 1.
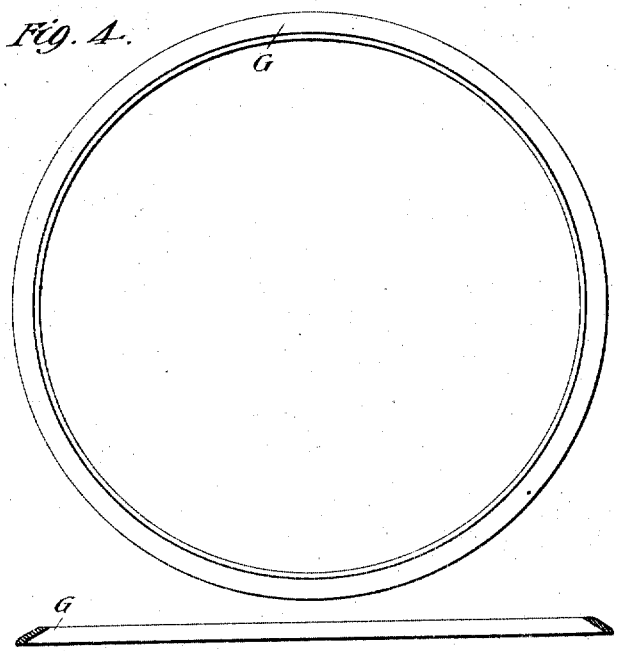
Fig. 4.
Fig. 5.
Witnesses:
Inventor:
HENRY HESS,
By his Attorney
Robert Fletcher Rogers

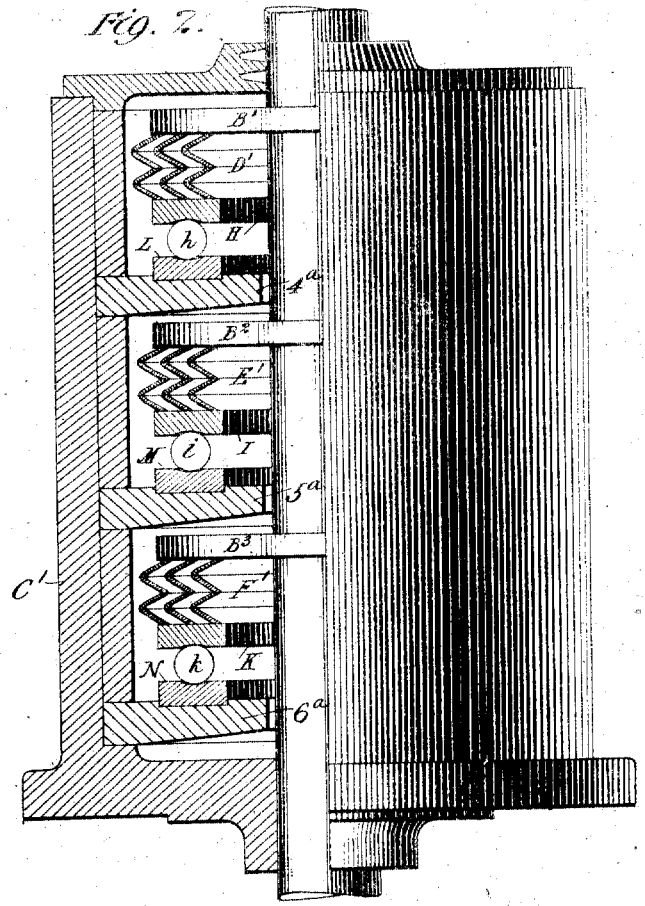
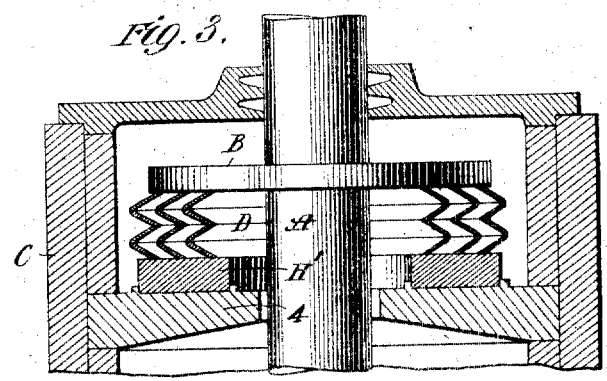

to be placed under tension, and to arrange the# UNITED STATES PATENT OFFICE.

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

THRUST-BEARING.

1,232,800.

Specification of Letters Patent.

Patented July 10, 1917.

Application filed August 13, 1908, Serial No. 448,308. Renewed December 2, 1916. Serial No. 184,739.

*To all whom it may concern:*

Be it known that I, HENRY HESS, a citizen of the United States, residing at Wawa, in the county of Delaware and State of Pennsylvania, have invented certain new and useful Improvements in Thrust-Bearings, of which the following is a specification, reference being had therein to the accompanying drawing.

This invention relates to thrust bearings for use more particularly in connection with shafts subjected to heavy thrust loads, the objects of the invention being to distribute the load among a plurality of bearings in such manner that, without manual adjustments of the bearings relatively to each other, the load will be properly distributed among them and will automatically readjust itself among the several bearings in the event of unequal wear.

With these ends in view my invention consists primarily in combining with a shaft provided with a plurality of thrust faces, a plurality of relatively fixed thrust abutments, and a plurality of yielding members interposed between the thrust faces and the abutments whereby each yielding member may be formed so as to take its proportionate amount of the load, and whereby in the event of unequal wear relieving one of the members of its proper share of the load, a greater load will be imposed on the other bearings and the latter subjected to correspondingly greater wear, which continuing, will cause a reestablishment of the normal conditions and the proper distribution of the thrust among the several bearings as before.

The yielding members between the thrust faces and the thrust abutments may be of different forms, such for instance as springs, pressure chambers confining fluid under pressure, and the like, and these yielding members may be combined with thrust faces and abutments arranged either concentrically around the shaft in a plane at right angles to the longitudinal axis, or in tandem one behind the other; and the surfaces of contact between the yielding members and the thrust abutments may be of a rolling character, such as would be produced by the provision of friction balls or rolls between these parts, or they may be of a sliding character, such as would be produced by the provision of bearing plates. I prefer, however, to construct the yielding members in the form of springs, adapted by compression to be placed under tension, and to arrange the thrust faces and the thrust abutments concentrically around the shaft in parallel planes, the springs being interposed between these parts in concentric arrangement and serving by their combined action to give support to the shaft and sustain the thrust load.

In the accompanying drawings:—

Figure 1 is a view partly in elevation and partly in longitudinal section through a shaft and its bearing support embodying my invention in its preferred form, the thrust faces, abutments and intermediate yielding members being arranged concentrically around the shaft, and the yielding members being in the form of springs.

Fig. 2 is a similar view showing the thrust faces and thrust abutments with the interposed yielding members arranged in tandem, one behind the other.

Fig. 3 is a sectional view showing the surfaces of contact formed by bearing plates and constituting a sliding contact.

Fig. 4 is a plan view of a detail.

Fig. 5 is a cross-section of the same.

Referring to Figs. 1, 4 and 5, A represents a rotary shaft provided with a collar B, presenting a flat annular surface surrounding the shaft and extending in a plane at right angles to the longitudinal axis of the same, the said flat surface forming in effect a plurality of thrust faces, in the present instance three in number, 1, 2 and 3, as indicated by the dotted lines in Fig. 1, and extending in the common plane of the flat surface of the collar. C represents a suitable fixed framing or support containing alining openings in which the shaft is mounted, and formed with a flat annular supporting surface surrounding the shaft and extending in a plane parallel with the plane of the collar, which supporting surface forms in effect a plurality of thrust abutments, in the present case three in number, 4, 5 and 6, which as indicated by dotted lines in Fig. 1 are so disposed that abutment 4 is in alinement with thrust face 1, abutment 5 with thrust face 2, and abutment 6 with thrust face 3.

Interposed between each thrust face and its opposing thrust abutment, is a yielding member, an outer one D between thrust face 1 and abutment 4, an inner member E between thrust face 3 and abutment 6, and an intermediate member F between the thrust face 2 and abutment 5. These yielding members are each in the form of an annular spring made up of a series of rings or cylinder-sections G formed with sloping walls greater in diameter at one end than at the other end, and placed end to end, one series of rings within the other, thereby constituting a series of concentric coils, each coil comprising, in the present instance, four rings, and each spring comprising, in the present instance, three coils. At their upper ends the springs bear respectively against the thrust faces, while at their opposite ends they act on the thrust abutments through the medium of annular plates H, I and K, which in turn rest upon three series of friction balls $h$, $i$ and $k$, sustained respectively by bearing plates L, M, and N, supported in turn by the thrust abutments 4, 5 and 6, the upper and lower plates and the three series of interposed friction balls constituting ball-bearings, forming a rolling contact between the springs and the thrust abutments.

The combined strength of the springs is such that they will yieldingly support the whole thrust load to which the shaft is subjected, and each spring is so formed that it will support only a proportionate amount of this load, the result being that the thrust load is distributed among the several bearings in proportion to the strength of the different springs. As a result of this construction and arrangement, and assuming that the several springs are of the same strength, greater wear on one of the bearings will result in a slight elongation of its spring, and a consequent decrease of the load on that bearing, which will be accompanied by a corresponding increase of load on the other bearings, causing the latter to have increased wear, and this wear continuing, will result in a corresponding elongation of their springs and a final reestablishment of the proper normal conditions, with the first bearing receiving with the others, its proper amount of load. Such action would be more likely to occur with the bearings arranged concentrically as shown in Fig. 1, in which construction the outer bearing would necessarily, by reason of its greater diameter and its greater distance from the axis of rotation, receive greater wear than the others, although with a rolling contact, such as is produced by the ball-bearings shown, this would be far less in proportion than with a sliding contact, such as is illustrated in Fig. 3, in which the balls are omitted and the single bearing plate H', is supported by the thrust abutment 4.

As shown in Fig. 2, instead of the several supporting members being arranged concentrically in a single plane at right angles to the axis of rotation, they may be arranged in tandem, one behind the other. In this case, the thrust faces are formed respectively on three collars B', B² and B³, projecting at intervals from the shaft in different parallel planes, and the thrust abutments are formed by three annular fixed flanges 4ª, 5ª and 6ª extending inwardly from a surrounding frame or casing C' in different planes parallel with the planes of the thrust faces, the springs D', E' and F' being interposed respectively between these parts and acting in their combined effect, to sustain the full thrust load, each spring taking its proportionate amount of this load. In the action of this form of bearing, the distribution of the load is the same as in that first described, and in the event of unequal wear, the spring of the bearing subjected to the greatest wear, will elongate slightly and relieve this bearing of a portion of the load, throwing it on the other two bearings, which will be subjected to greater wear, and the parts will in this manner, as in the first instance described, automatically readjust themselves to the proper normal conditions, all the bearings taking their proper amount of the load.

It will be observed that each spring is given a fixed support relatively to the shaft and to the other springs, and that they act independently of each other, and as a consequence of this fact and the total disconnection of the springs, as far as their expansion and contraction is concerned, any pressure taken from one spring by reason of unequal wear will be immediately transmitted to and divided among the other springs, so that the unequal wear is automatically corrected, and the bearing will operate without any manual adjustments or resetting, to uniformly and properly distribute the load among the several bearings and cushioning members.

Having thus described my invention, what I claim is:—

In a thrust bearing, the combination with a shaft provided with an annular thrust face, of a relatively fixed annular thrust abutment, and a spring interposed between said parts and consisting of coils surrounding the shaft in concentric arrangement one within the other and exerting its pressure respectively against the thrust face and the thrust abutment.

In testimony whereof I have affixed my signature in presence of two witnesses.

HENRY HESS.

Witnesses:
 NETTIE L. HAHN,
 THEO. H. M'CALLA.